(12) United States Patent
Leafe

(10) Patent No.: US 12,385,734 B2
(45) Date of Patent: Aug. 12, 2025

(54) MEASURING DEVICE WITH PROTECTION MEMBER HAVING CONDUIT FOR LIGHT BEAM AND STREAM OF AIR AND METHOD

(71) Applicant: RENISHAW PLC, Wotton-under-Edge (GB)

(72) Inventor: Harry Alan Leafe, Oxford (GB)

(73) Assignee: RENISHAW PLC, Wotton-under-Edge (GB)

( * ) Notice: Subject to any disclaimer, the term of this patent is extended or adjusted under 35 U.S.C. 154(b) by 185 days.

(21) Appl. No.: 17/916,759

(22) PCT Filed: Mar. 24, 2021

(86) PCT No.: PCT/GB2021/050720
§ 371 (c)(1),
(2) Date: Oct. 3, 2022

(87) PCT Pub. No.: WO2021/198647
PCT Pub. Date: Oct. 7, 2021

(65) Prior Publication Data
US 2023/0147278 A1    May 11, 2023

(30) Foreign Application Priority Data

Apr. 3, 2020   (GB) ...................... 2004933

(51) Int. Cl.
*G01B 11/02* (2006.01)
*B23Q 17/24* (2006.01)
(Continued)

(52) U.S. Cl.
CPC .......... *G01B 11/02* (2013.01); *B23Q 17/2457* (2013.01); *G01B 11/08* (2013.01); *G01B 21/047* (2013.01); *B23Q 2717/00* (2013.01)

(58) Field of Classification Search
CPC .. G01N 21/15; G01N 2021/151; G01N 21/84; G01B 11/08; G02B 27/0006; G02B 1/16; G02B 1/18
See application file for complete search history.

(56) References Cited

U.S. PATENT DOCUMENTS 4,836,689 A * 6/1989 O'Brien ................ G01J 5/0806
359/509
5,818,009 A * 10/1998 Nakata ............... B23K 26/1476
219/121.84
(Continued)

FOREIGN PATENT DOCUMENTS

CN    103376262 A    10/2013
DE    102014019336 B3    1/2016
(Continued)

OTHER PUBLICATIONS

Sep. 9, 2020 Search Report issued in British Patent Application No. 2004933.4.

(Continued)

*Primary Examiner* — Tran M. Tran
(74) *Attorney, Agent, or Firm* — Oliff PLC

(57) ABSTRACT

A protection member for an optical measurement device, such as a break-beam tool setting device for a machine tool. The protection member includes a conduit through which light and air can pass. The conduit is configured such that, in use, a beam of light is passed through the conduit along an optical axis and a stream of air is guided out of the conduit along an airflow axis. The optical axis is non-parallel to the airflow axis and the conduit has a varying cross-sectional profile along the airflow axis. Improved measurement repeatability is provided.

16 Claims, 7 Drawing Sheets

(51) Int. Cl.
*G01B 11/08* (2006.01)
*G01B 21/04* (2006.01)

(56) References Cited

U.S. PATENT DOCUMENTS

| | | | | |
|---|---|---|---|---|
| 6,091,501 | A * | 7/2000 | Saikanmaki | G01N 21/15 |
| | | | | 356/402 |
| 6,307,175 | B1 * | 10/2001 | Blochlinger | B23K 26/389 |
| | | | | 219/121.72 |
| 6,496,273 | B1 | 12/2002 | Stimpson et al. | |
| 7,053,392 | B2 * | 5/2006 | Stimpson | B23Q 17/2485 |
| | | | | 250/214 DC |
| 7,312,433 | B2 | 12/2007 | Stimpson et al. | |
| 8,079,952 | B2 * | 12/2011 | Fujimoto | G02B 23/2423 |
| | | | | 600/156 |
| 8,444,330 | B2 | 5/2013 | Srivastan et al. | |
| 8,497,466 | B2 | 7/2013 | Martelli et al. | |
| 9,001,319 | B2 * | 4/2015 | Tokhtuev | G01N 21/645 |
| | | | | 359/507 |
| 9,157,723 | B2 * | 10/2015 | Lee | G01B 21/10 |
| 9,464,982 | B2 * | 10/2016 | Tokhtuev | G02B 27/0006 |
| 9,599,557 | B2 * | 3/2017 | Gigler | G01N 21/15 |
| 9,782,784 | B2 | 10/2017 | Schmon et al. | |
| 10,036,811 | B2 * | 7/2018 | Böckem et al. | G01S 17/66 |
| 10,095,026 | B2 * | 10/2018 | Eineren | G03B 17/02 |
| 10,259,091 | B2 | 4/2019 | Klugger et al. | |
| 10,739,581 | B2 * | 8/2020 | Lyyra | H04N 23/55 |
| 11,604,122 | B2 * | 3/2023 | Han | F15D 1/025 |
| 11,643,052 | B2 * | 5/2023 | Sykula | B60J 1/2002 |
| | | | | 15/313 |
| 12,048,977 | B2 * | 7/2024 | Ferguson | B23Q 17/00 |
| 12,085,413 | B2 * | 9/2024 | Merrifield | G01B 21/047 |
| 2004/0191013 | A1 | 9/2004 | Sugata et al. | |
| 2005/0024650 | A1 | 2/2005 | Stimpson et al. | |
| 2005/0126605 | A1 * | 6/2005 | Yassour | H01L 21/67034 |
| | | | | 134/198 |
| 2010/0206384 | A1 | 8/2010 | Martelli et al. | |
| 2011/0073142 | A1 * | 3/2011 | Hattori | B60S 1/481 |
| | | | | 134/198 |
| 2012/0087647 | A1 | 4/2012 | Srivatsan et al. | |
| 2013/0056556 | A1 | 3/2013 | Schmon et al. | |
| 2018/0111240 | A1 | 4/2018 | Klugger et al. | |
| 2021/0385364 | A1 | 12/2021 | Ferguson et al. | |
| 2022/0024421 | A1 * | 1/2022 | Lundy | B08B 13/00 |

FOREIGN PATENT DOCUMENTS

| | | |
|---|---|---|
| EP | 1 050 368 A1 | 11/2000 |
| EP | 1 502 699 A2 | 2/2005 |
| JP | 2002-011641 A | 1/2002 |
| JP | 2003-232975 A | 8/2003 |
| JP | 4077634 B2 | 4/2008 |
| JP | 2011-073080 A | 4/2011 |
| JP | 5523041 B2 | 6/2014 |
| WO | 2020/183154 A1 | 9/2020 |

OTHER PUBLICATIONS

Jun. 17, 2021 International Search Report issued in International Patent Application No. PCT/GB2021/050720.

Jun. 17, 2021 Written Opinion of the International Searching Authority issued in International Patent Application No. PCT/GB2021/050720.

\* cited by examiner

MEASURING DEVICE WITH PROTECTION MEMBER HAVING CONDUIT FOR LIGHT BEAM AND STREAM OF AIR AND METHOD

The present invention relates to optical (non-contact) measurement devices, particularly to such devices in which a flow of expelled air is used to protect the various optical components from contaminants of the type typically found in a machine tool environment.

It is known to protect non-contact measurement devices, such as non-contact tool measurement devices, from the contaminants (e.g. coolant, cutting debris etc) that arise from machining operations conducted by a machine tool. One example of such a non-contact tool measurement device is a laser tool setter that detects when a tool held by a machine tool breaks a narrow laser beam thereby allowing tool measurements, such as tool length and diameter, to be acquired.

EP1050368 and EP1502699 describe examples of such a laser tool setter in which a laser beam is passed from a transmitter portion to a receiver portion via a region of free space. The laser beam enters and exits the device via a narrow channel or conduit in each of the transmitter and receiver portions. In such devices, each channel is formed (e.g. by drilling) at an oblique angle to the optical axis along which the laser beam passes between the transmitter and receiver. Expelled air is thus directed (angled) away from the free-space optical path traversed by the laser beam. These angled air channels are illustrated, for example, in FIG. 4c of EP1050368 and FIG. 4 of EP1502699. The NC4 non-contact tool setting system sold by Renishaw plc, Wotton-Under-Edge, UK is an example of a device that includes such an angled aperture. An example of a break-beam tool setter device that expels air along its optical axis is described in US2018/111240. US2010/0206384 describes an alternative apparatus in which a tubular air shield is provided from an array of air nozzles surrounding a central aperture through which a laser beam passes.

Although known devices of the type described above reduce air turbulence in the free-space optical path traversed by the laser beam, the present inventors have found that some air turbulence effects can still be present thereby degrading measurement repeatability.

According to the present invention there is provided a protection member for an optical measurement device, the protection member comprising a conduit through which light and air can pass, the conduit being configured such that, in use, a beam of light is passed through the conduit along an optical axis and a stream of air is guided out of the conduit along an airflow axis, the optical axis being non-parallel to the airflow axis, characterised in that the conduit has a varying cross-sectional profile along the airflow axis.

The present invention thus relates to a protection member for an optical measurement device, such as a non-contact tool measurement device. The protection member comprises a conduit or passageway through which, in use, there is passed both a beam of light and a flow (stream) of air. In use, light is passed through the conduit along the optical axis, which may be perpendicular to an outer surface of the protection member. The air that is guided through the conduit is expelled from the conduit along an airflow axis that is slanted or angled relative to the optical axis. The expelled air is thus directed away from the light beam in an attempt to prevent turbulent air flow along the free-space path of the light beam.

The present invention is characterised by the conduit having a varying (i.e. changing) cross-sectional profile along the length of the airflow axis. In particular, the cross-sectional area and/or cross-sectional shape of the conduit is varied along its length in order to reduce the turbulence of the air expelled therefrom. This is unlike the conduits of EP1050368 and EP1502699 that are formed by, for example, drilling a hole through a blank protection member along the airflow axis (thereby producing a conduit with an invariant cross-sectional profile along the length of the airflow axis). The varying shape of the conduit has been found to reduce the overall airflow turbulence of the expelled air thereby reducing the amount of turbulence that is present in the free-space beam path. The varying shape can also be used to reduce the volume of air that needs to be expelled to provide a certain level of protection against external contaminants. Both of these improvements have been found to provide an improvement in measurement repeatability.

It should again be noted that the conduit is also configured to allow the light beam to pass along the optical axis (i.e. an axis angled relative to the airflow axis). The light beam passing through the conduit may be clipped (e.g. attenuated or shaped) by the conduit or it may pass unhindered through the conduit. The above described improvements to the air flow properties can thus be attained without affecting the optical performance of the protection member.

Advantageously, the conduit has an entrance opening for receiving air and an exit opening for expelling air. The entrance opening conveniently has a different cross-sectional area than the exit opening. Preferably, the cross-sectional area of the entrance opening is greater than the cross-sectional area of the exit opening. In other words, the entrance to the conduit may be wider than the exit. This change (e.g. reduction) in cross-sectional area along the conduit reduces the air turbulence within the conduit prior to the air being expelled thereby reducing the turbulence of the expelled air. The entrance opening may also have an at least partially fluted profile. For example, any "sharp" edges may be flattened to provide a smoother, less turbulent, flow of air. In a preferred embodiment, a hole may be drilled and then widened and appropriately shaped using a laser cutting process to form the conduit. This two-stage process minimises the burrs that are formed which could otherwise introduce some air turbulence.

Advantageously, at least a portion of the conduit has an asymmetrical cross-sectional profile. For example, the circular or oval cross-sections of prior art conduits may be replaced by asymmetrical cross-sections. The conduit may thus be non-cylindrical. Conveniently, the conduit has an exit opening that is substantially D-shaped when viewed along the optical axis.

Advantageously, the conduit presents a substantially circular cross-section to light passing therethrough along the optical axis. In other words, the conduit is shaped so that a substantially circular beam of light may pass through it along the optical axis. The conduit may clip or shape the optical beam. Alternatively, substantially all of an incident light beam may pass straight through the conduit along the optical axis.

The protection member may include further components to help direct the flow of air through the conduit and/or that interact with the light beam. For example, the protection member may comprise an optical aperture (i.e. an aperture that is separate to the conduit) for constricting a light beam passed along the optical axis. The optical aperture may shape and/or attenuate the light beam. The cross-section of the conduit to light when viewed along the optical axis may be slightly larger than the associated optical aperture. For example, the effective radius of the conduit along the optical axis may be 0.1 mm larger than the radius of such an optical aperture. All of the air expelled via the protection member may also pass through the optical aperture. Alternatively, there may be other holes or passages through which some of the air can pass (i.e. without passing through the optical aperture).

All of the air that exits the conduit may be directed in substantially the same direction (i.e. along the air flow axis). For example, all the air flow expelled from the conduit may be directed either up, down or to the side of the optical axis. The airflow axis is non-parallel (e.g. inclined or oblique) relative to the optical axis so the flow of air has the smallest possible effect on light passing along the optical axis. In particular, the protective stream of air preferably cuts across the optical path in a very localised area and only in one direction. This provides a stable airflow arrangement that improves measurement repeatability. Advantageously, there may be no substantial portion of the stream of air expelled from the conduit that moves in a direction along, or parallel to, the optical axis. In other words, the air is preferably ejected in an off-axis direction.

Conveniently, the airflow axis may be angled by more than 5° relative to the optical axis. The airflow axis may be angled by more than 10° relative to the optical axis. The airflow axis may be angled by more than 15° relative to the optical axis. The airflow axis may be angled by more than 20° relative to the optical axis. The airflow axis may be angled by less than 45° relative to the optical axis. Preferably, the airflow axis is angled by around 30° relative to the optical axis. Although a larger angle directs air further from the path of the free-space light beam, it does require the conduit to be larger (i.e. to ensure the beam can still pass along the optical axis) and hence there is reduced ingress protection and/or more air has to be expelled.

The protection member preferably consists of only a single conduit. The single conduit may have only a single exit aperture from which air is expelled. The physical shape of the single conduit may define the airflow direction. Preferably, all air expelled through the protection member passes through the single conduit. A complex arrangement of multiple air nozzles of the type described in US2010/0206384 can thus be avoided. The amount of air consumption required to provide a certain level of protection against contaminant ingress is also reduced.

The protection member may be integrally formed with an optical measurement device. For example, the protection member may form a part of the casing or outer shell of such a device. Conveniently, the protection member may include one or more features for releasable attachment to the transmitter or receiver of an optical measurement device. For example, the protection member may be formed as a cap that can be attached to, and detached from, the optical measurement device. A variety of such caps may then be provided for different configurations of the optical measurement device. Such caps may be configured to fit prior art measurement devices (i.e. they may be retrofittable). The optical components of the optical measurement device (e.g. lenses/detectors) are preferably recessed within the device (i.e. behind the conduit of the protection member).

The present invention also extends to an optical measurement device that comprises at least one protection member as described above. The optical measurement device may comprise a transmitter having a protection member and/or a receiver having a protection member. In such an example, the protection members may be nominally the same or they may be different. For example, protection members with differently sized conduits and/or differently sized optical apertures may be provided for the transmitter and receiver. The air turbulence generated at the transmitter may be less that than generated at the receiver. A kit of multiple protection members with conduits and/or optical apertures of different sizes may also be provided to allow measurement devices to be configured as required.

The optical measurement device may include other optical components (lenses, light sources, receivers etc). The optical measurement device may include other air flow control devices (e.g. control valves, flow restrictors, one-way valves etc). Advantageously, the optical measurement device may include an internal air chamber adjacent the conduit of each protection member. Such an internal air chamber may help reduce the turbulence of air entering the conduit of a protection member, thereby reducing the turbulence of expelled air. The air flow through the internal air chamber may also be arranged to avoid the optical path through the air chamber. Also, the air flow though the chamber may converge at the conduit. This can reduce the effect of turbulence on the beam of light as it passes through the air chamber.

The conduit size may be selected to give the best balance of repeatability and air consumption versus accuracy. For example, the size of the optical aperture can be maintained and the repeatability improved. Alternatively, the size of the optical aperture can be increased to improve metrology whilst maintaining repeatability. A suitably dimensioned protection member could thus be used for each required application.

In a preferred embodiment, the optical measurement device is a tool measurement device, such as a break-beam tool measurement device. The tool measurement device may be mountable to the bed of a machine tool. Air, or another gas, may be fed into the device (e.g. from a machine shop compressed air supply). The supply of air may be at a substantially constant flow rate. Alternatively, the flow of air may be changeable (e.g. based on the level of protection required) during use. For example, low and high flow rates may be used. The air supply may be stopped completely, for example when air protection is not required. The protection member may also form part of the shutter assembly described in our patent application PCT/GB2020/050581.

Also described herein is a protection member for an optical measurement device. The protection member may comprise a conduit through which light and gas (e.g. air) can pass. The conduit may be configured such that, in use, a beam of light is passed through the conduit along an optical axis. The conduit may be configured such that, in use, a stream of air (or other gas) is guided out of the conduit along an airflow axis. The optical axis may be non-parallel to the airflow axis. The conduit may have a varying cross-sectional profile along the airflow axis. The conduit may be a substantially smooth aerodynamic conduit. The substantially smooth aerodynamic conduit may be venturi-like. The conduit may be substantially smooth (e.g. by chamfering or blending radii during manufacture). The member may include any of the other features, alone or in combination, described herein.

The invention will now be described, by way of example only, with reference to the accompanying drawings in which.

Figure 3:
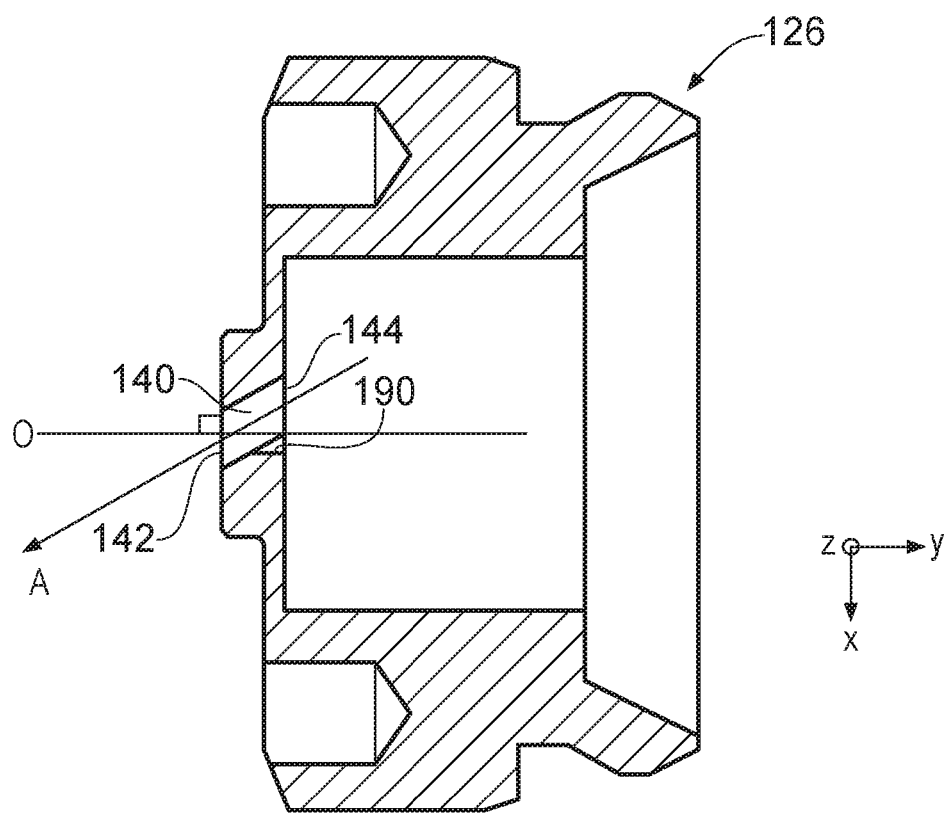
Figure 4:
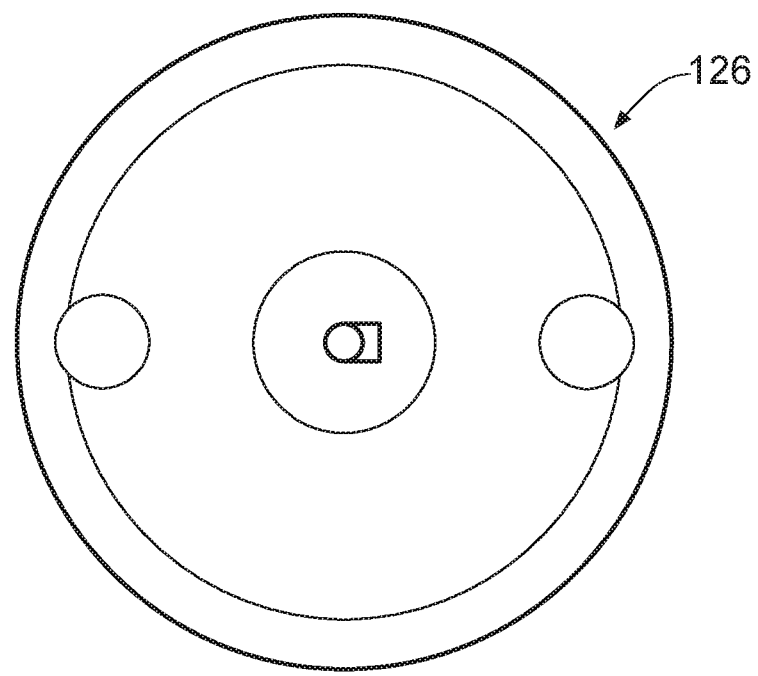
Figure 5:
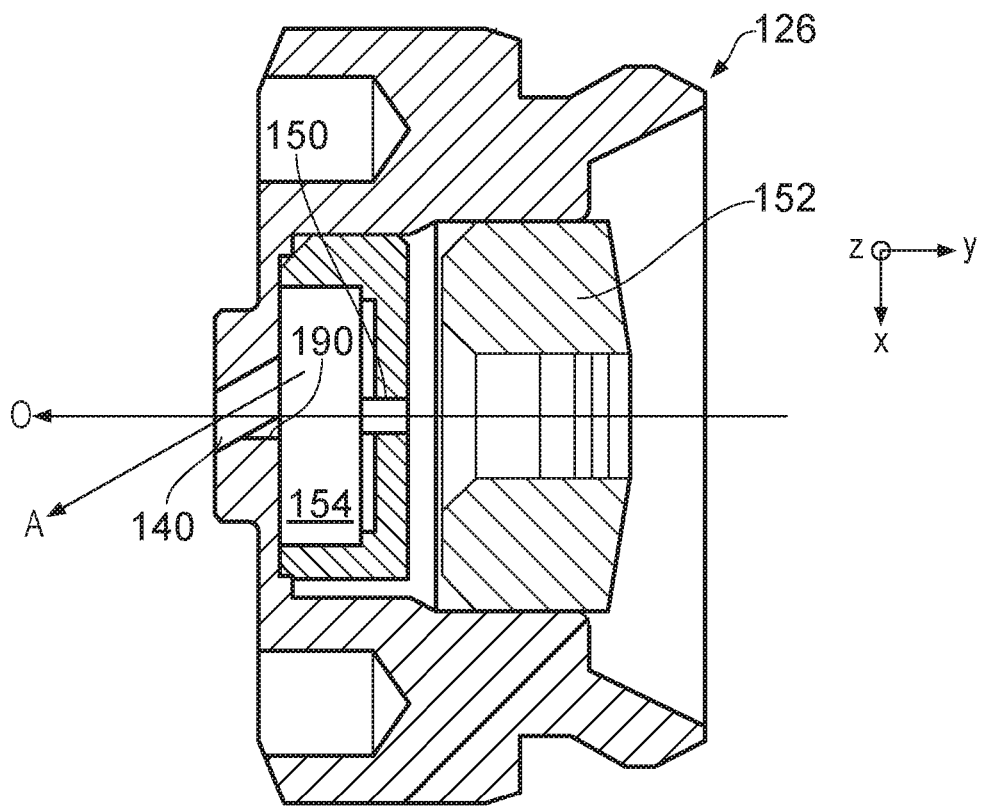
Figure 6:
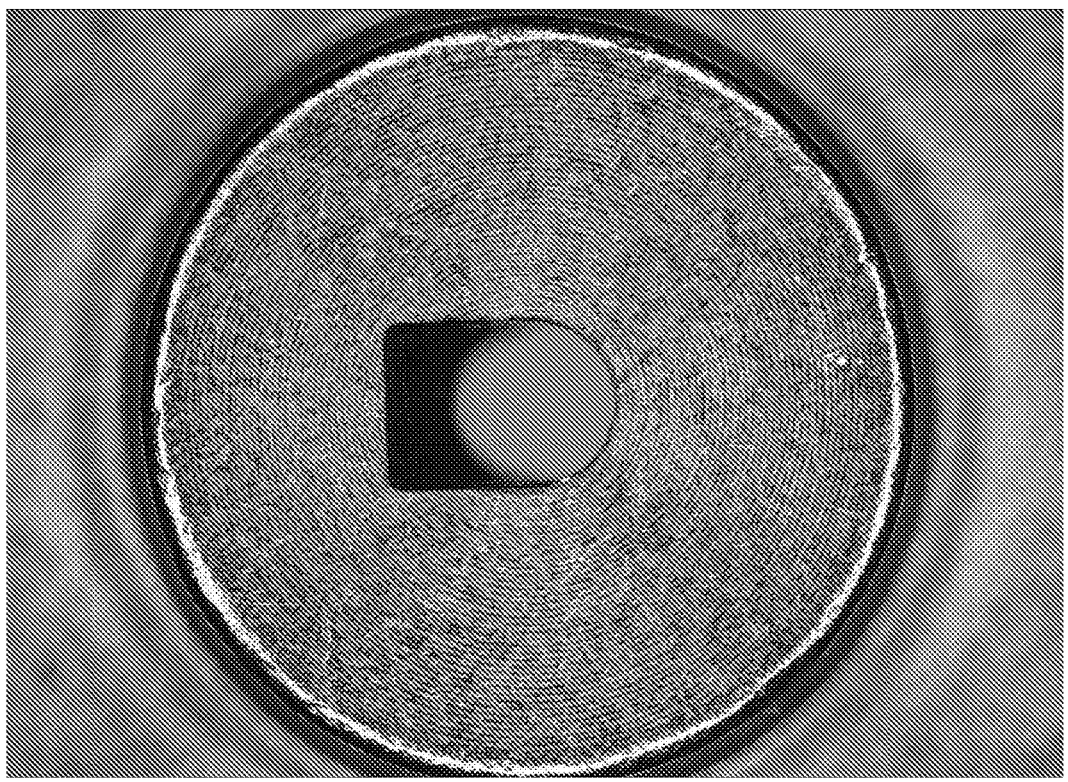
Figure 7:
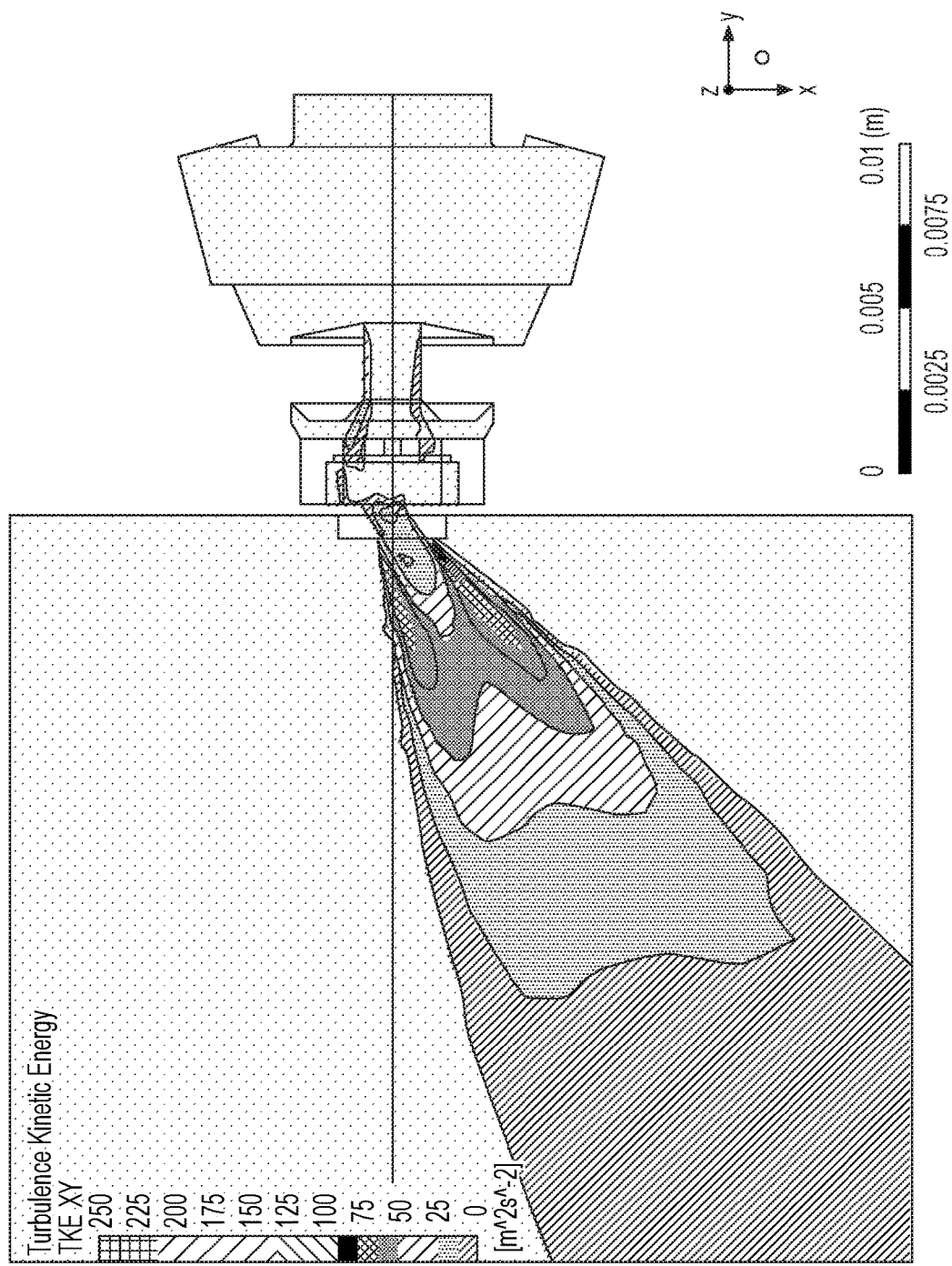
Figure 8:
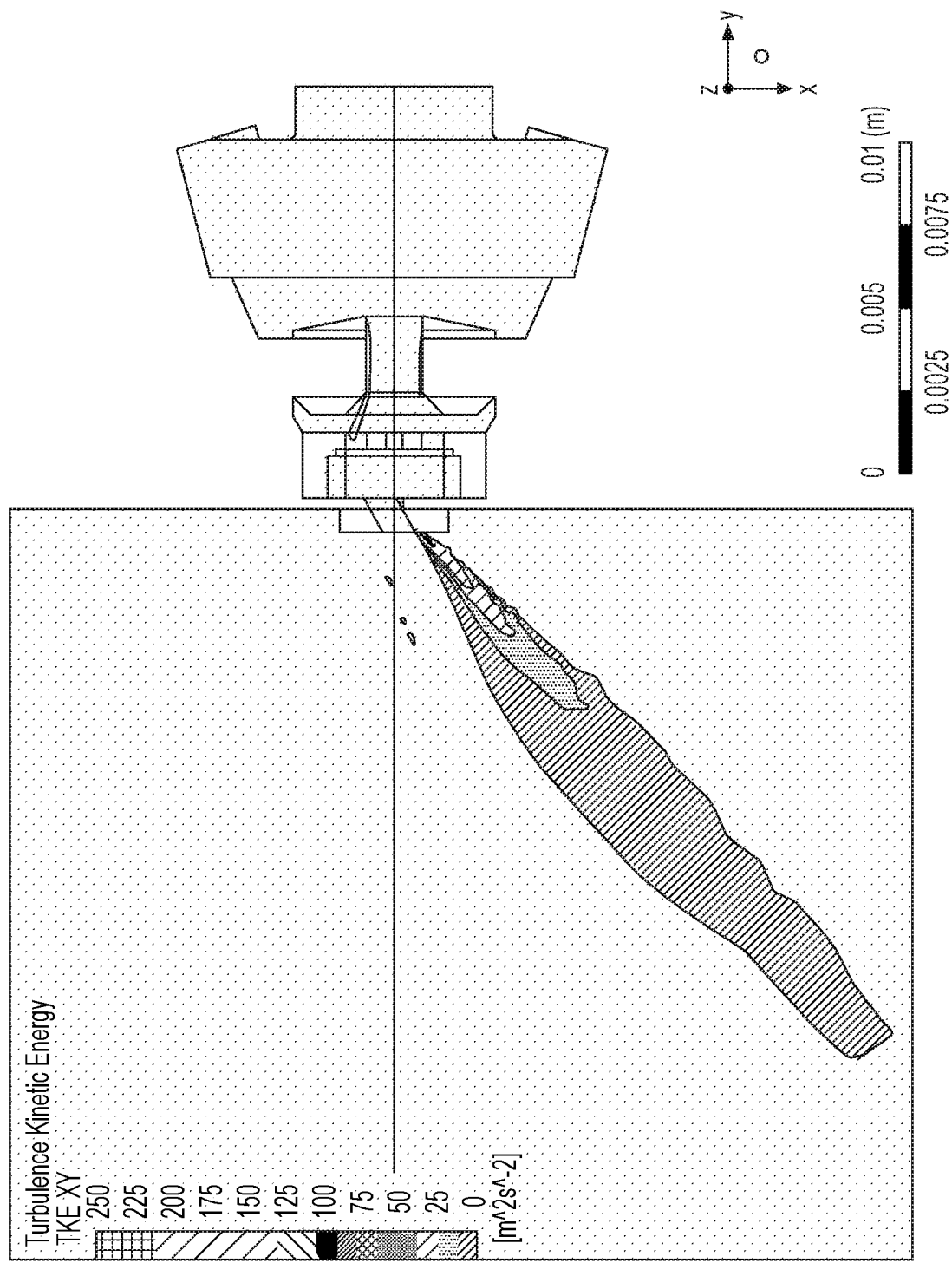
Figure 9:
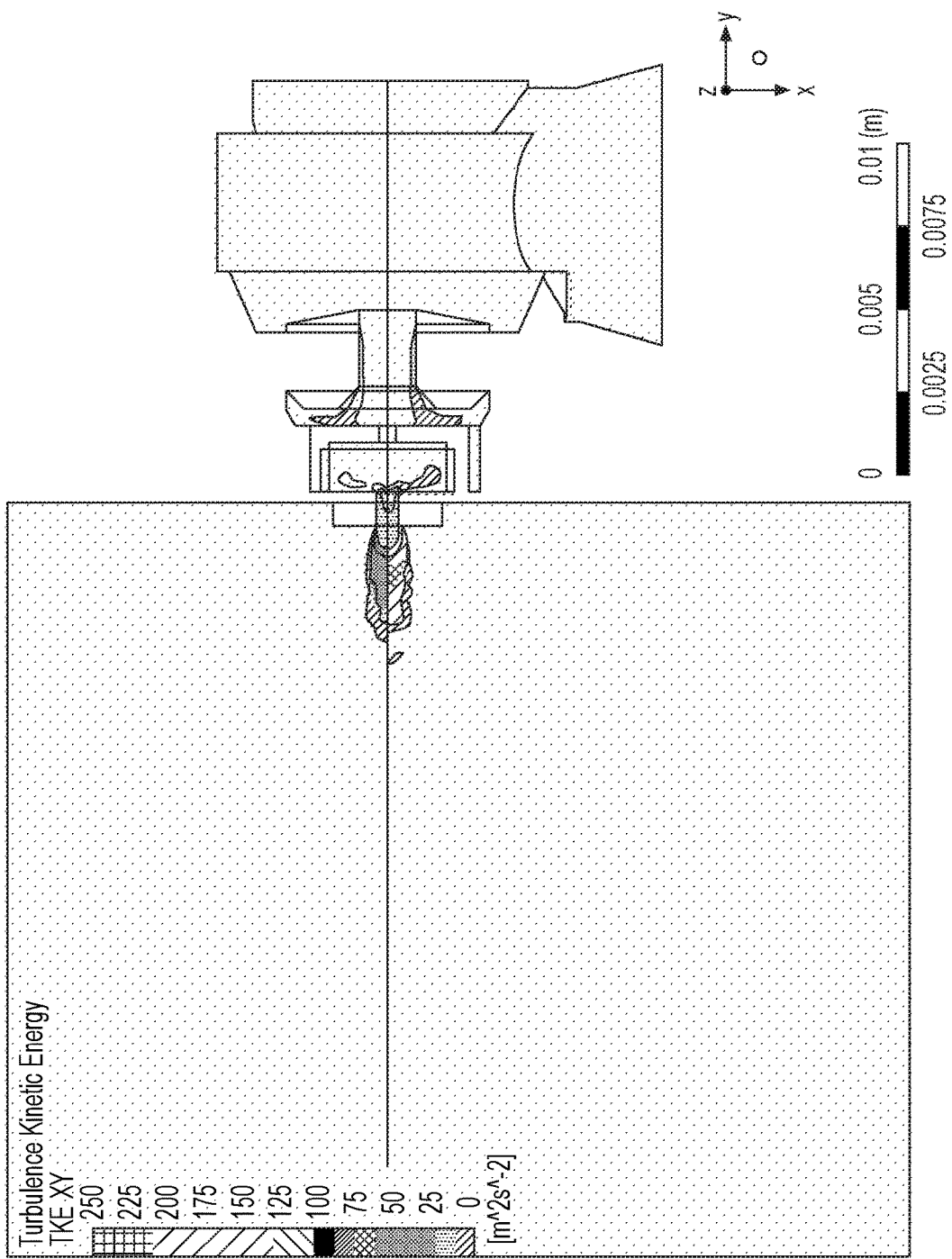
Figure 10:
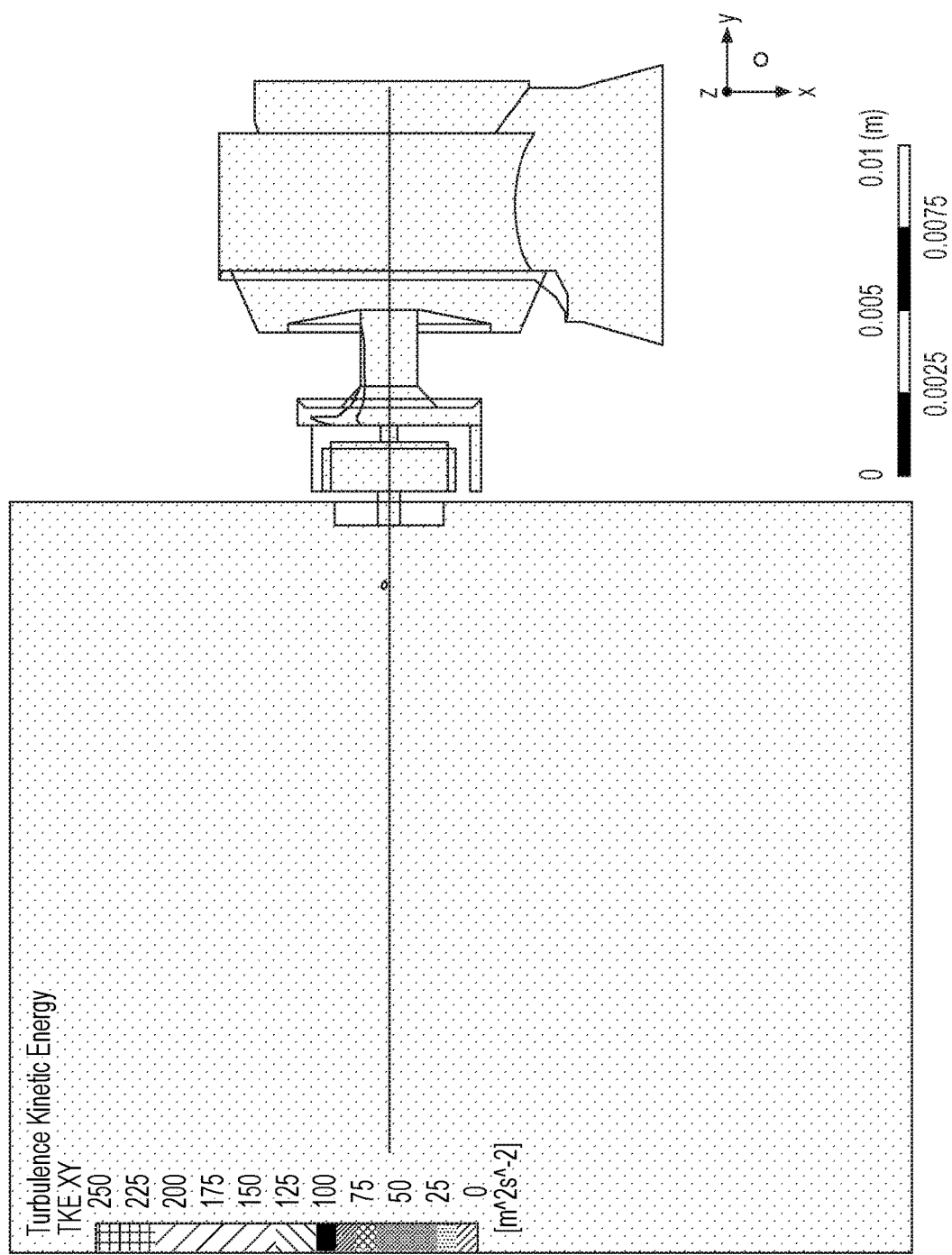

FIG. 3 shows a cut-through image of a cap in accordance with the present invention for use with a non-contact tool setting device, FIG. 4 shows a frontal view of the cap of FIG. 3, FIG. 5 shows a cut-through image of a cap in accordance with the present invention with an additional air flow insert, FIG. 6 is a photograph of a cap made in accordance with the structure illustrated in FIG. 3, FIG. 7 shows the air turbulence in the x-y plane associated with a prior art cap, FIG. 8 shows the air turbulence in the x-y plane associated with a cap of the present invention, FIG. 9 shows the air turbulence in the y-z plane associated with a prior art cap, and FIG. 10 shows the air turbulence in the y-z plane associated with a cap of the present invention.

Figure 1:
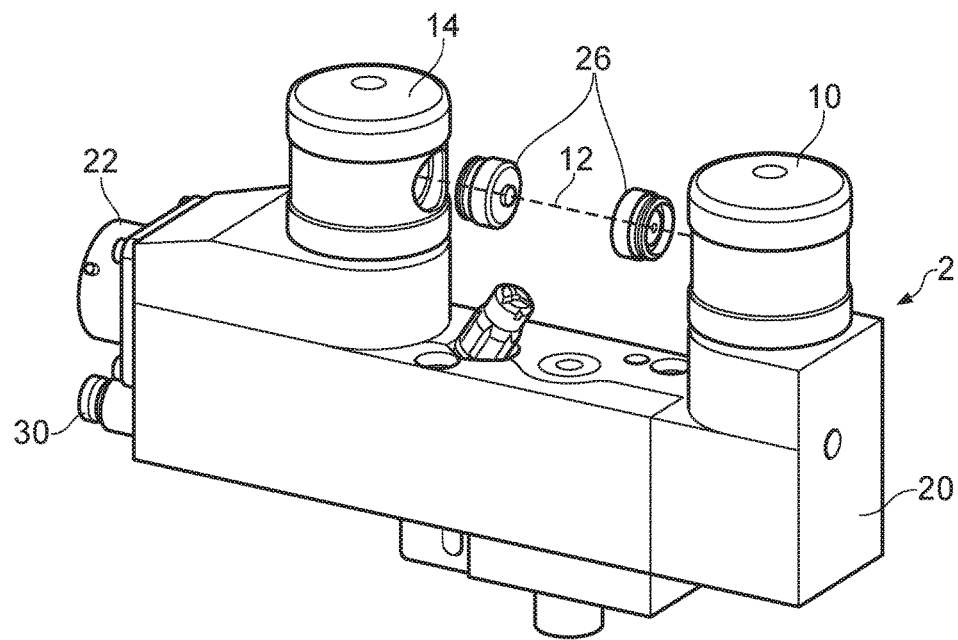
FIG. 1 shows a non-contact tool setting device.

Referring to FIG. 1, a partially exploded view of a prior art tool setter device 2 is shown. The device comprises a transmitter unit 10 including a laser diode and appropriate optics (not shown) for generating a beam of light 12. A receiver unit 14 comprising a photodiode (not shown) is also provided for detecting the intensity of the received light beam 12. The transmitter unit 10 and receiver unit 14 are both affixed to a common base 20 thereby maintaining a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or the transmitter and receiver units could be separately mounted to the machine tool. An electrical socket 22 is provided on the base 20 for connection via a cable to an associated interface (not shown) that provides electrical power and receives a beam intensity signal from the detector of the receiver unit 14.

The tool setter device 2 is designed to operate in the harsh environment of a machine tool, wherein pressurised streams of coolant, coolant mist and cutting debris etc are often present. Long-term and reliable device operation is possible in such harsh conditions by using a so-called air protection system. The transmitter unit 10 and receiver unit 14 thus include air caps 26 that comprise passages or conduits 28 through which the light beam 12 is passed. In FIG. 1, the air caps 26 are shown detached from their respective transmitter and receiver units for illustration purposes (but would be attached to such units during use). In use, compressed air is fed into the body of the device from an air inlet 30. The device is arranged so that at least some of such air is bled out of the device via the same conduits 40 in the caps 26 through which light passes. This continual air bleed prevents contaminants from entering the device whilst still allowing light to enter and exit the device as appropriate so that measurements can be performed.

Figure 2:
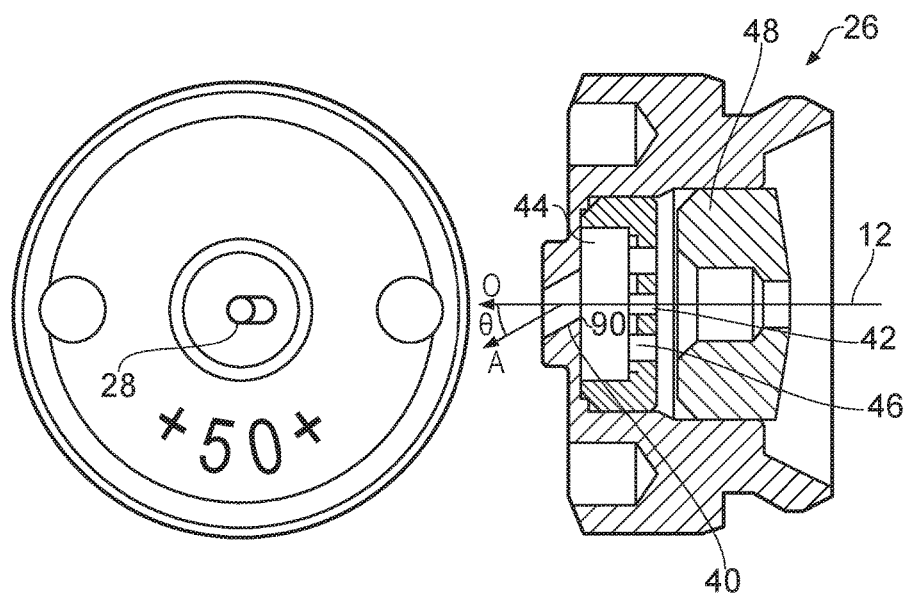
FIG. 2 shows a prior art cap for a non-contact tool setting device.

Referring now also to FIG. 2, the configuration of the prior art air caps 26 is shown in more detail. Each air cap 26 includes a slanted passageway or conduit 40 through which air is expelled. This conduit 40 is formed by drilling through the blank cap at an oblique angle to the surface normal of the outermost surface of the member. The size and oblique angle of the conduit 40 are selected so that a light beam passing through an optical aperture 42 along a direction normal to the outermost surface of the member (i.e. along an optical axis of the light beam) can also pass through the conduit. The conduit 40 also expels air that has been forced under pressure into a chamber 44 through a series of air holes 46, optionally via an air flow restrictor 48. The air is expelled in a direction approximately parallel to the angle at which the conduit is formed. In other words, air is expelled along an airflow axis (A) that is at an oblique angle (θ) to the optical axis (O) of the light beam. As explained in EP1050368 and EP1502699, this arrangement helps to direct air flow away from the free-space optical path of the beam (i.e. the free-space path between the transmitter and received units traversed by the optical beam) thereby reducing the effect such an airflow would have on the measurement accuracy of the device.

Although the prior art arrangement provides reliable protection against contaminants, it has been found by the present inventors that turbulence within the expelled air stream can still disrupt the airflow along the free-space optical path of the beam thereby having a detrimental effect on the measurement performance of the device. The present invention, as will now be described below, has been found to improve the measurement accuracy of the device by reducing the air flow turbulence associated with the expelled air. In particular, it has been found that altering the cross-sectional profile along the conduit (i.e. in the direction along the airflow axis A) can significantly reduce the turbulence of air that is expelled from such a conduit compared to a prior art conduit that has an invariant cross-section along its length. For example, removing any sharp edges in the air flow path through the conduit and/or reducing the cross-sectional area of the conduit along its length (i.e. in the air flow axis direction) has been found to reduce the turbulent flow of expelled air.

Referring to FIGS. 3 and 4, an air cap 126 in accordance with the present invention is illustrated. The air cap includes a conduit 140 that has a region of constant cross-section 142 but includes a region 144 having an increasing cross-sectional area. In particular, the sharp edge 90 visible in the air cap 26 of FIG. 2 is replaced by the flattened section 190 shown in FIG. 3. This change in the shape of the opening of the conduit 140 thus provides a "D-shaped" conduit 140 when viewed from the direction of the surface normal (i.e. along the optical axis) as illustrated in FIG. 4. When installed on a tool setter device (e.g. as shown in FIG. 1) air is expelled along the airflow axis A whilst a light beam passes along the optical axis O. The airflow axis A is inclined or angled relative to the optical axis O.

FIG. 5 shows how the air cap 126 described with reference to FIGS. 3 and 4 can further comprise an optical aperture 150 that, for example, can clip the optical beam passing therethrough. An optional air flow restrictor 152 is also provided; it has been found that providing such an air flow restrictor with a uniform cross-section followed by a widening aperture acts to further reduce the turbulence of air flow passing into the chamber 154. In this example, the diameter of the aperture in the airflow restrictor 152 is around 1.7 mm and the optical aperture 150 has a diameter of around 0.5 mm. A flow rate of around thirty litres per minute is passed through the air cap 126. The shape of the airflow restrictor 152 is preferably free of steps or sudden changes in section; this helps reduce air turbulence effects.

FIG. 6 is photograph of an air cap made in accordance with the illustrations of FIGS. 3 and 4. The D-shaped conduit is formed by drilling a hole through from along the surface normal direction of the blank and then laser cutting the remaining profile. Other fabrication techniques would, of course, be possible.

Referring next to FIGS. 7 to 10, air flow modelling results are presented to illustrate the reduced air turbulence generated when using an air cap as described with reference to FIGS. 3 to 6 compared with the prior art air cap as shown in FIG. 2. In particular, FIG. 7 shows the air turbulence in the XY plane for a prior art air cap as shown in FIG. 2. It can be seen that the air turbulence extends to the optical axis O along which the light beam passes. FIG. 8 shows the air turbulence in the XY plane for an air cap of the present invention as described with reference to FIGS. 3 to 6. It can be seen that the modification to the shape of the conduit reduces the overall turbulence associated with expelled air and that the amount of air turbulence in the vicinity of the optical axis O is greatly reduced. This can also be seen from the air turbulence in the YZ plane plot as shown FIG. 9 for a prior art air cap and FIG. 10 for the air cap of the present invention. The air caps could, of course, be placed in any desired orientation relative to the axes of an associated measurement device or machine tool.

It should be remembered that the above is merely one example of the present invention and the skilled person would appreciate the variants that would be possible. For example, the air caps could be fitted to only one of the receiver or transmitter units or to a combined transmitter/receiver unit of a reflective device. It would also be possible to use the air caps on other measurement devices, not just tool setters. Although a removable air cap is described it would also be possible for the conduit etc to be formed as an integral part of a measurement device. For example, the conduit could be provided as part of an access panel or housing portion.

The invention claimed is:

1. An optical measurement device, comprising:
   a light source,
   an air inlet, and
   at least one protection member, the at least one protection member comprising a conduit through which a light beam from the light source and a stream of air from the inlet can pass, wherein
   the optical measurement device is configured such that the beam of light is passed through the conduit along an optical axis while the stream of air is guided out of the conduit along an airflow axis,
   the optical axis is non-parallel to the airflow axis, and
   the conduit has a varying cross-sectional profile along the airflow axis.

2. The optical measurement device according to claim 1, wherein the conduit has an entrance opening for receiving air and an exit opening for expelling air, wherein the entrance opening has a different cross-sectional area than the exit opening.

3. The optical measurement device according to claim 2, wherein the cross-sectional area of the entrance opening is greater than the cross-sectional area of the exit opening.

4. The optical measurement device according to claim 3, wherein the entrance opening has an at least partially fluted profile.

5. The optical measurement device according to claim 1, wherein at least a portion of the conduit has an asymmetrical cross-sectional profile.

6. The optical measurement device according to claim 1, wherein the conduit has an exit opening that is substantially D-shaped when viewed along the optical axis.

7. The optical measurement device according to claim 1, wherein the conduit presents a substantially circular cross-section to light passing therethrough along the optical axis.

8. The optical measurement device according to claim 1, further comprises an optical aperture for constricting a light beam passed along the optical axis.

9. The optical measurement device according to claim 1, wherein the airflow axis is angled by more than 10° relative to the optical axis.

10. The optical measurement device according to claim 1, wherein the protection member includes one or more features for releasable attachment to a transmitter or receiver of the optical measurement device.

11. The optical measurement device according to claim 1, comprising an internal air flow control member to minimise turbulence of the air flow directed to the conduit of the protection member.

12. The optical measurement device according to claim 1, comprising an internal air chamber adjacent the conduit of each the at least one protection member.

13. The optical measurement device according to claim 1, wherein the measurement device is a break-beam tool measurement device.

14. A break-beam tool measurement device comprising
   a transmitter,
   a receiver, and
   an air inlet for receiving compressed air, wherein
   the transmitter comprises a light source for generating a beam of light that is passed to the receiver through a region of free space,
   at least one of the transmitter and the receiver comprise a protection member,
   the protection member comprises a conduit through which the beam of light and a stream of compressed air from the air inlet are passed,
   the conduit is configured such that the beam of light is passed through the conduit along an optical axis while the stream of air is guided out of the conduit along an airflow axis,
   the optical axis is non-parallel to the airflow axis, and
   the conduit has a varying cross-sectional profile along the airflow axis.

15. The break-beam tool measurement device according to claim 14, wherein the airflow axis is angled by more than 10° relative to the optical axis.

16. The break-beam tool measurement device according to claim 14, wherein the protection member includes one or more features for releasable attachment to the transmitter or receiver.

* * * * *